United States Patent Office 3,446,330
Patented May 27, 1969

3,446,330
SPRING-SUPPORTED BELT CONVEYOR
Kurt Rudolf Schneider, 4 Juliand St.,
Bainbridge, N.Y. 13733
Filed Apr. 28, 1965, Ser. No. 451,468
Int. Cl. B65g 21/00
U.S. Cl. 198—117                                    15 Claims

ABSTRACT OF THE DISCLOSURE

This disclosure relates to a conveying mechanism for feeding flat articles along a predetermined path and includes a conveyor-belt stage having a frame to which is journalled an endless conveyor belt for moving articles from an entrance end toward an article discharge end of the mechanism, and spring means and means for effecting bodily pitching and rolling action of the conveyor-belt stage are disposed generally medially of the frame between the article entrance and discharge ends to constantly compensate for article thickness variations and to produce generally uniform pressure on all articles as they are advanced by the conveyor belt.

---

In machines of this type, as such are exemplified in my earlier Patents Nos. 2,754,022, 2,907,567 and 3,010,864 and my application Ser. No. 80,778, filed Jan. 5, 1961, now Patent No. 3,252,849, it is of vital importance that the articles to be labeled (hereinafter for convenience referred to as "mailing pieces") which are separately withdrawn from the hopper unit of the machine serving to maintain a plurality of said pieces arranged in vertical stack formation, be thereupon advanced in a coordinated manner to and thence past the label-applying instrumentality which applies the label or discharges the same, the latter in the event that the lable has been determined to be non-acceptable and/or that no mailing piece is in position to receive same.

While operating in generally satisfactory manner, continuing experience with the mailing piece feed-through means constructed according to my aforesaid patents and applications revealed the advisability if not the need for revision in the design thereof as would render the labeling machine incorporating same sufficiently versatile as to meet the demand for both a professional or high-production labeling machine and of a one-person small office machine. Another factor prompting reconsideration of the design of the previous mailing-piece feed-through means was the initial high cost thereof, taken with the high cost of the servicing required to maintain same in proper adjustment as enables it to accept mailing pieces of widely varying thicknesses and to positively feed same to and past the label applying instrumentality without distortion known as "buckling" in the case of thin mailing pieces.

Broadly stated, a major object of the present invention is the provision of improved, simplified and trouble-free mailing-piece feed-through means for label applying machines, illustratively of the type employing a punch mechanism for severing individual labels from a sheet thereof and for applying the individual labels to moistened areas of each of a succession of mailing pieces continually feeding past the same, and wherein it is a requirement of such feed-through means that it advance the mailing pieces to and past the punch mechanism while at the same time pressing them against top-plate mounted rollers and/or directly against the under surface of the top plate of the machine.

More particularly, an important object of the present invention is the provision of mailing-piece feed-through means as aforesaid incorporating an improved conveyor-belt stage, i.e. a downwardly yielding platform mounting powered conveyor belts, which is so constructed and arranged that when disposed immediately beneath top-plate mounted rollers and/or the machine top plate it operates in conjunction therewith in thoroughly dependable manner to advance mailing pieces of varying thicknesses from rearwardly disposed feed rollers to and past a label-applying instrumentality operating through said top plate.

Another object of the invention is to provide an improved conveyor belt stage as aforesaid characterized by simple design making for both economical construction and trouble-free operation, and which also contributes substantially to rendering a labeling machine in which it is incorporated highly versatile both as respects the type of service to which it may be put and as respects the type of mailing piece it is adapted to handle.

Another important object of the invention is the provision of an improved conveyor belt stage for label-applying machines of the stated character, which is unique in its ability to advance thin mailing pieces which by their very nature are subject to being buckled when fed by the prior conveyor belt stage means to the label-applying instrumentality of the machine.

Still another object of the invention is the provision of a conveyor belt stage as aforesaid, which incorporates means for effecting discharge of any label properly severed from its label sheet by the label-applying instrumentality, i.e. punch, but for which there is present no mailing piece to receive same, thus insuring proper label application to the next following mailing pieces.

Yet a further object of the invention is the provision of highly effective run-out roller means for use in conjunction with improved conveyor belt stage means as aforesaid and which cooperates with said stage means in manner as to provide a thoroughly dependable, integrated mailing-piece feed-through system for label-applying machines of the stated character.

The above and other objects and features of advantage contemplated and provided by the present invention will appear from the following detailed description of an illustrated embodiment thereof shown in the accompanying drawings wherein:

Referring to FIGS. 1–4 which generally illustrate a label-applying machine according to my aforesaid Patents Nos. 2,754,022, 2,907,567 and 3,010,864 and my application Ser. No. 80,778 (Patent No. 3,252,849), and for which the article (mailing-piece) feed-through means of the present invention was designed and for which it is uniquely adapted, and using insofar as possible the same reference characters and/or numerals as used in said Patent No. 2,754,022 and application, reference character BH designates a base housing having a top plate TP over which a label sheet L, on which rests a label pressure plate SHQ mounting a label sensing switch LSS, is adapted to be fed to a punch mechanism PM contained in the punch housing PH. Said base housing at its feed-in end mounts a table TR which supports upstanding side guide plates GP between which a stack E of mailing pieces such as envelopes, postcards, etc. may be placed, said table also mounting a front guide plate GF against which the forward edges of the mailing pieces of the stack are held while a lower mailing piece is being withdrawn for subsequent advancement to the punch mechanism.

Figure 4:
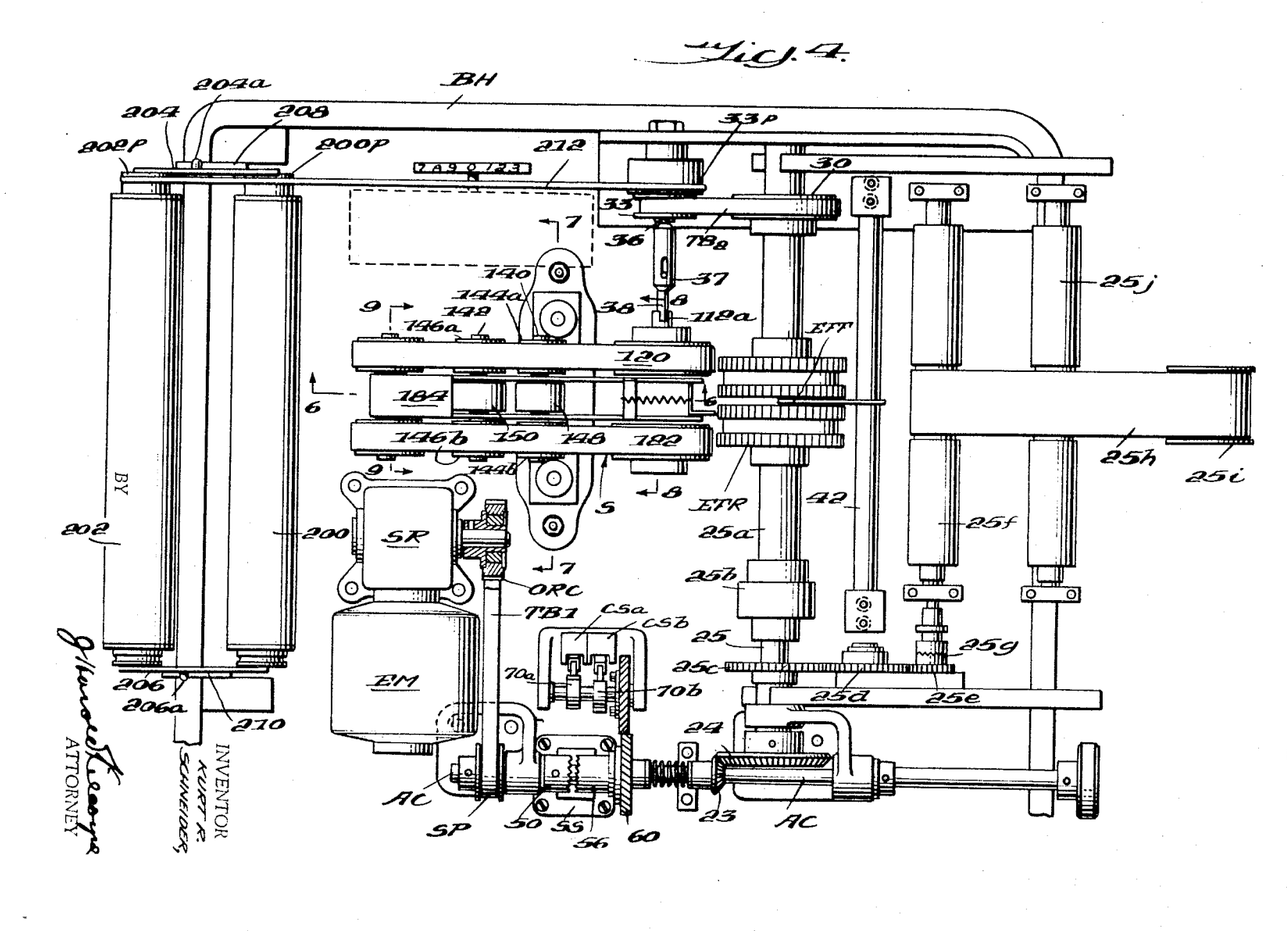
FIG. 4 is a sectional view taken through FIG. 2 on a horizontal plane cutting through the machine base just below the top plate and front table thereof, and which illustrates generally the machine parts and power drive means contained within said machine base.

A power drive for the various parts or mechanisms of the machine required to be driven is provided, such by reference to FIG. 4 being substantially enclosed within the base housing BH. Illustratively, said power drive comprises an electric driving motor EM which drives through a speed reducer SR, overrunning ball clutch ORC, timing belt $TB_1$ and sprocket pulley SP, a main drive shaft AC mounting a bevel gear 23 in mesh with a bevel gear 24 on a primary feed-roll shaft 25. Said latter shaft extends transversely across the base housing and mounts on its far end a driver sprocket pulley 30 driving a timer belt $TB_2$ which in turn drives a sprocket pulley 33 which powers the shaft 37 having universal joints 36, 38 at its ends and which functions as a drive shaft for the conveyor stage generally designated S, to which the present invention is in large part directed and which will be later described in detail.

The aforesaid shaft 25 operates within a tubular drive shaft 25a to which are affixed the primary feed-in rollers EFR of the feed-in means, the shaft 25 driving said shaft 25a by means of an overrunning clutch 25b. As explained in my aforesaid application Ser. No. 80,778, the normal peripheral speed of the feed rollers EFR, when driven by the shaft 25, is less than that at which the twin conveyor belts of the stage S to be described operate so that, when picked up by the conveyor belt stage, a mailing piece to be labeled is advanced more rapidly than while being advanced by said feed rollers EFR, the overrunning clutch 25b permitting such action by enabling shaft 25a to overrun shaft 25.

Gears 25c, 25d, 25e drive an article feeding roll 25f through the clutch 25g, assuming engagement of the latter. Roll 25f receives one end of an endless feed-in belt 25h which at its free end is carried by a wobble pulley 25i fast on a shaft mounted beneath the table plate TR, and whose upper and lower flights are positionally controlled intermediate their respective lengths by an idler roller 25j. As such article (mailing-piece) feed-in means is fully disclosed in my Patent No. 2,907,567, further detailed description thereof is not here believed necessary.

Figure 1:
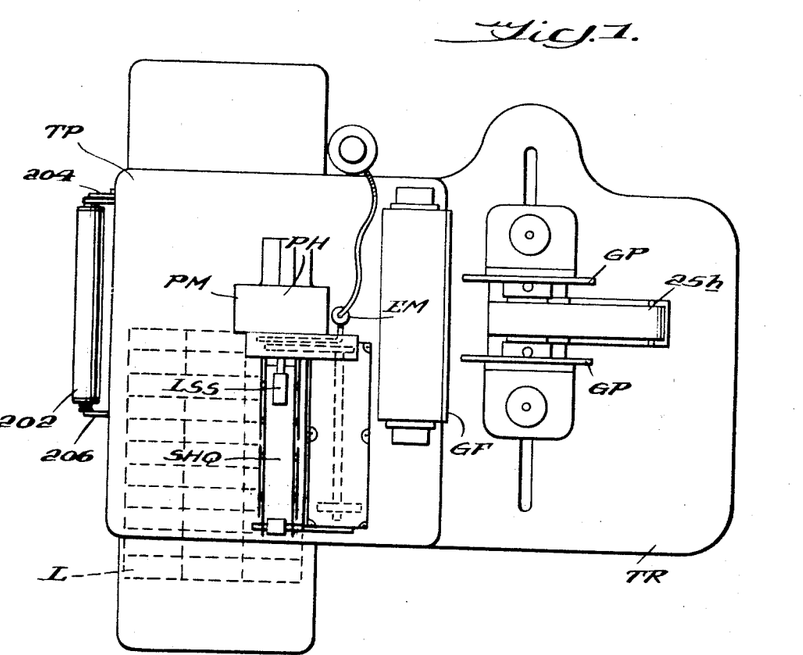
FIGS. 1 and 2 are generalized top plan and side elevational views of a lable-applying machine of the type for which the improved mailing-piece feed-through means of the present invention is intended, FIG. 2 being taken from the label-sheet feed-in side of said machine.
Figure 2:
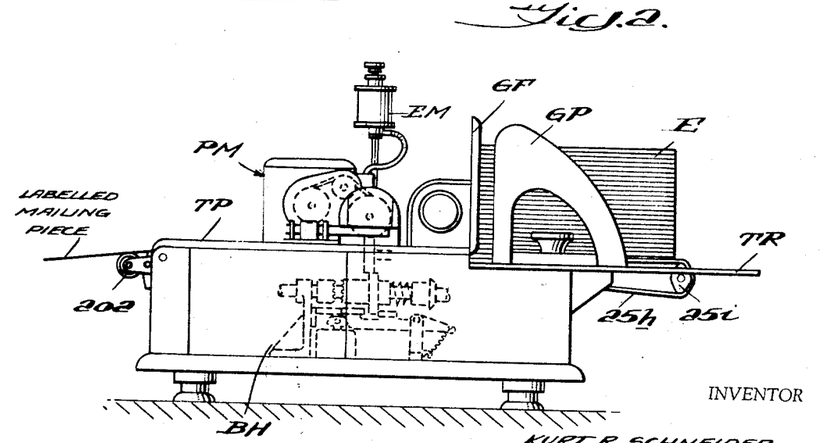
Figure 3:
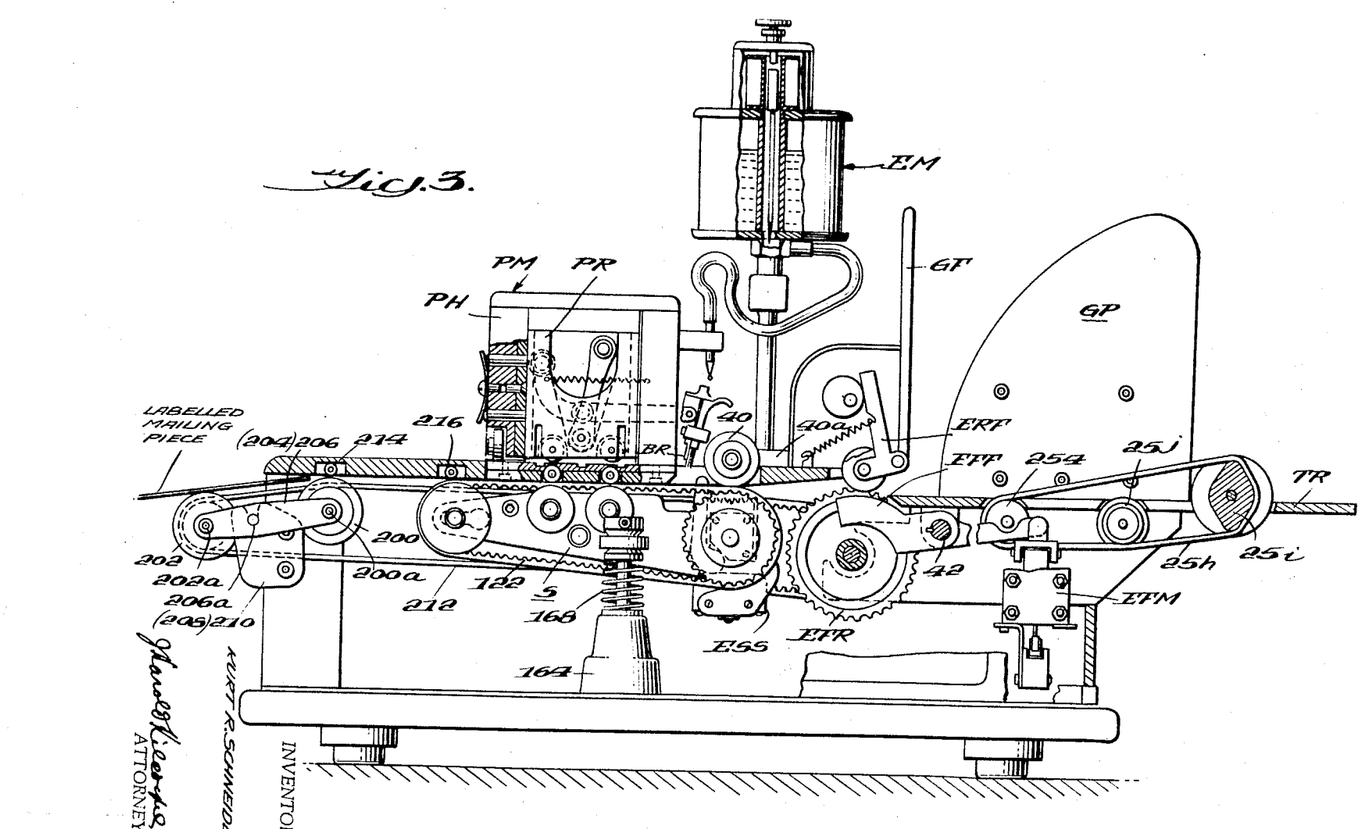
FIG. 3 is a partly broken-away longitudinal section taken through FIG. 1 on a vertical plane disposed just to the viewer's side of the label-applying instrumentality, i.e. the punch mechanism, and with parts of said mechanism shown in section and other parts removed.

As also seen in FIGS. 3 and 4, a rock shaft 42 has one or more article-controlling feed fingers EFF affixed thereon, said fingers being raised when said shaft is rocked in proper direction by electromagnetic means EFM, and when raised functioning to prevent mailing-piece advancement. Separator members ERF of the adjustable type are mounted above the feed rolls EFR and function to hold all but the bottommost article of the stack positioned on the table TR and belt 25h. As the structure and manner of operation of both said article-controlling feed finger EFF and said separator members are fully described in my prior Patent No. 2,907,567, reference may be had thereto for details.

As further seen in FIG. 4, the constantly driven main drive shaft AC has a driving clutch head 50 affixed thereto for cooperative engagement with a driven clutch-head assembly 56 that includes a helical gear 60 and which normally rotates freely on said shaft but which is actuated into driving engagement with said driven head when a solenoid structure SS is energized. Said clutch heads and solenoid are preferably components of the improved clutch mechanism design disclosed and claimed in my concurrently filed application Ser. No. 451,563, now Patent No. 3,315,056, issued Feb. 21, 1967, and which as will be understood from my prior Patents Nos. 2,915,160 and 3,010,864 showing a prior clutch design, functions to transmit drive to the instrumentalities of the machine which are required to be driven intermittently throughout definite cycles of motion, including without limitation the punch mechanism PM, the label-sheet feeding means and the timing cams 70a, 70b which actuate the cam switches CSa, CSb (FIG. 4).

Referring now to the article (mailing-piece) feed-through means to which the present invention is primarily addressed, and first to the conveyor-belt stage which advances the mailing pieces to the punch mechanism PM, it is first to be noted (see FIG. 5) that said stage has overall length such that its rearward end, which is disposed just forward of the aforesaid primary feed rollers EFR will be engaged and pressed upon by the rollers 40 of a pair thereof turning freely on an axle carried by a block 40 affixed to the forward end of the table TR and depending into a top plate opening above said rearward end, and that its forward end will extend to and under the top plate portion disposed on the discharge side of said punch mechanism. Thus, in effect, the stage is disposed below the top plate TP in position to act in conjunction with the under surface thereof. Said stage comprises a pair of longitudinal upright side frames 100, 102 (FIGS. 6-9) which are spaced apart laterally at the rearward or pick-up end of the stage, i.e. the end next adjacent the aforesaid primary feed rolls EFR, by a generally square-sectioned pillow block 104, at the central portions thereof by a spacing and tie rod 106, and at the forward or discharge end of the stage by the outwardly facing shoulders of a shouldered cross shaft 108. As best seen in FIG. 8, said pillow block 104, to which the side frames are secured as by corner screws (FIG. 6), is provided with a cross bore in which is press-fitted the flanged tubular oilite bearings 110a, 110b providing for frictionless rotation of a powered cross shaft 112 whose ends project outwardly from the side frames and to which are affixed by set screws 114 a pair of flangeless driver sprocket pulleys 116, 118 about which are trained twin endless timing belts 120, 122. The other ends of said twin belts are trained over a pair of flanged idler sprocket pulleys 124, 126 disposed in longitudinal alignment with the aforesaid sprocket pulleys 116, 118, respectively, and turning on the reduced diameter ends of said shouldered cross shaft 108, which ends, like the ends of the cross shaft 112, project laterally from the side frames 100, 102. Said idler pulleys 124, 126 have somewhat lesser diameter than the driver pulleys 116, 118 but, by reference to FIG. 6 in particular, it will be seen that the axis of the cross shaft 108 about which said idler pulleys turn is contained in the slightly higher horizontal phane than that containing the axis of the cross shaft 112 as results in the upper peripheries of both the driving and idler sprocket pulleys being normally disposed in the same horizontal plane and thus in the upper flights of both timing belts 120, 122 normally traveling in paths disposed in the same horizontal plane.

Figure 6:
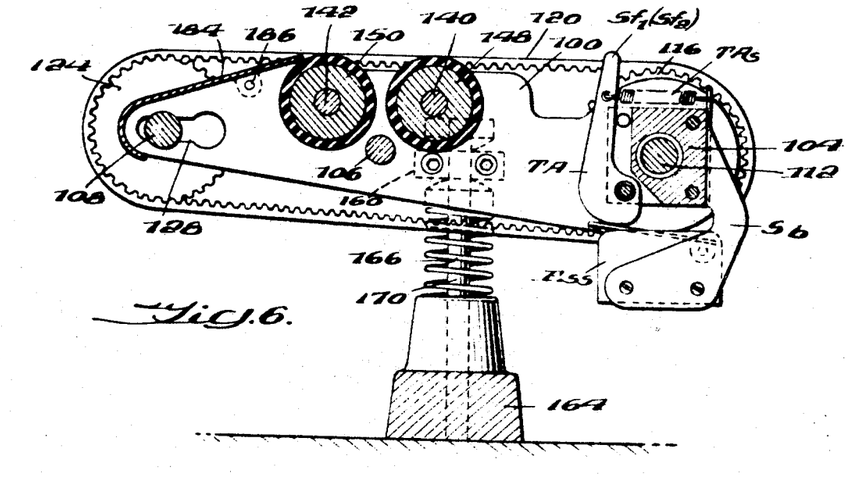
FIGS. 6, 7, 8 and 9 are sectional views taken on vertical planes designated by lines 6—6, 7—7, 8—8 and 9—9, respectively, of FIG. 4.
Figure 9:
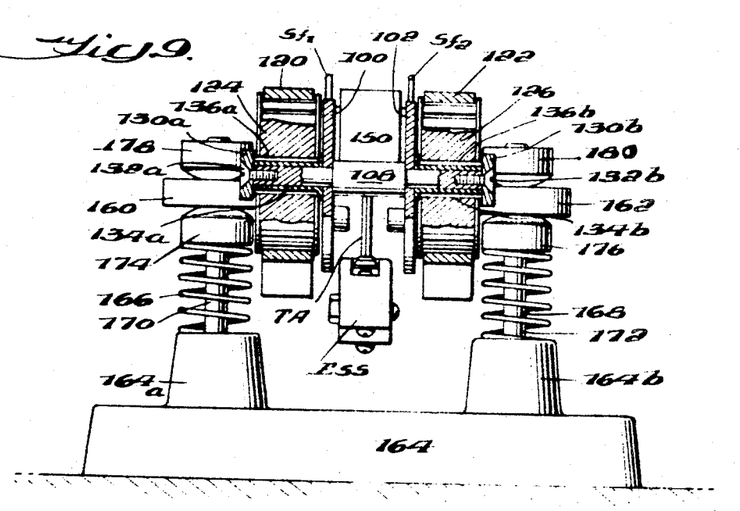

As also seen in FIG. 6, the holes 128 in the side frames 100, 102 through which the ends of the shouldered cross shaft 108 project, are of key-hole configuration and are disposed with their major axes extending longitudinally. This arrangement permits of the longitudinal positioning of said cross shaft 108 along the length of the key-hole shaped openings being adjusted as may be necessary to place the twin timing belts 120, 122 under a desired operating tension. Referring to FIG. 9, means for securing the cross shaft 108 in a desired adjusted position are provided, such illustratively comprising lock washers 130a, 130b which are secured flush against the outer ends of said shaft 108 by screws 132a, 132b threaded into said shaft and which serve to clamp the spacer bushings 134a, 134b, on which the idler pulleys 124, 126 are directly mounted, against the side frames 100, 102, thus to securely hold the assembly of cross shaft 108, spacer bushings 134a, 134b, lock washers 130a, 130b and the side frame ends together as a fixed unit. By further reference to FIG. 9, it will also be seen that oilite bearings 136a, 136b which are press-fitted into the bore of said idler sprockets 124, 126 and through which extend both the ends of the cross shaft 108 and the aforesaid spacer bushings 134a, 134b, provide for the frictionless rotation of the idler sprockets on the cross shaft 108.

Figure 7:
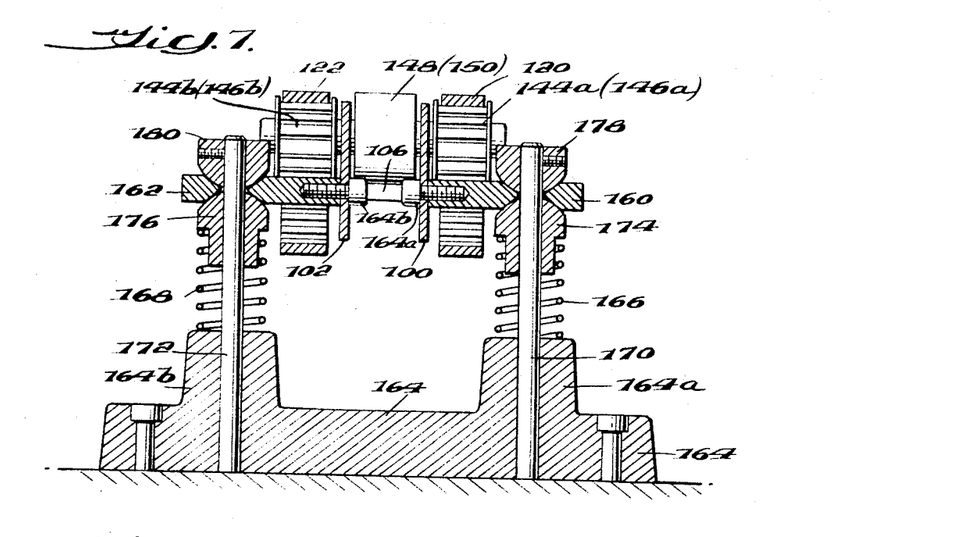
Figure 8:
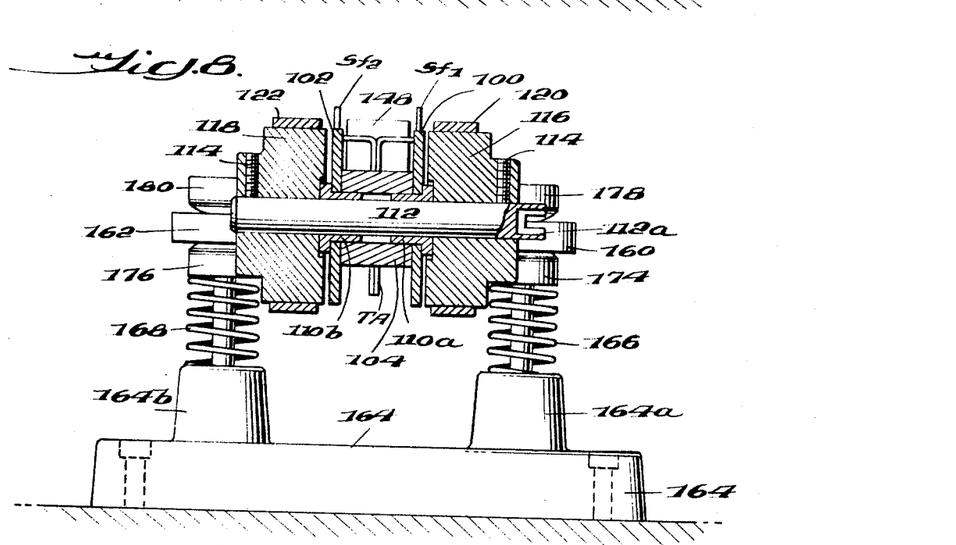

Near the middle length portion thereof, the side frames mount two longitudinally spaced, rotatable cross shafts 140, 142, whose ends project outwardly from the side frames, just as do the ends of the drive- and idler-pulley shafts 108, 112, respectively, and on the extended ends of said cross shafts are mounted the two axially related, side pairs of sprocket pulleys 144a, 144b and 146a, 146b (FIGS. 4 and 7). Said idler shafts 140, 142 are so located that the pitch lines of the pulleys 144a, 146a and 144b, 146b are tangent with the pitch lines of the aforesaid twin timing belts 120, 122, respectively. Thus, said twin timing belts drive said pairs of sprocket pulleys 144a, 144b and 146a, 146b just as they drive said idler sprocket pulleys 124, 126.

Disposed on the portions of said shafts 140, 142 which extend between the side frames 100, 102 are a longitudinally spaced pair of rubber-faced rollers 148, 150 having diameter such that their peripheries are tangent to the upper surface line of the aforesaid timing belts 120, 122. By the aforesaid arrangement, said rubber-faced rollers 148, 150 are positively driven by the timing belts, but it is a feature of the invention that each said roller is driven by only one of the two sprocket pulleys mounted on the same cross shaft (140 or 142) therewith. That is to say, the roller 148 is driven only by sprocket pulley 144a and the more forward roller 150 is driven only by the sprocket pulley 146a, such of course requiring that both said sprocket pulleys 144a, 146a and the rollers 148, 150 powered thereby shall be fast on their shafts 140, 142, assumed to be driven by the timing belt 120, for example. As to the sprocket pulleys 144b and 146b, they are left free to turn on said shafts 140, 142, which they do since their sprocket teeth are in mesh with those of the timing belt 122. Such an arrangement is of particular advantage in that, while it provides for positive drive of said rollers 148, 150 by one of the twin timing belts 120, 122, it makes wholly unnecessary any lining up of the teeth of the sprocket pulleys 144b, 146b with those of the axially related sprocket pulleys 144a, 146a and thus not only simplifies the initial assembly of the stage but also renders maintenance thereof relatively trouble free and servicing when needed very simple.

According to a further feature of the invention, the above described stage considered as a structural unit is mounted for both pitching motion about approximately its transverse middle axis and for rolling motion about any longitudinal axis about which it may be called upon to roll by the nature and/or position of a mailing piece. More particularly, the stage carries rocker arms 160, 162 which are affixed to the side frames 100, 102 as by bolts 164a, 164b (FIG. 7) so that they project outwardly from said side frames at horizontally aligned points thereof which are preferably located approximately a third of the length thereof as measured from the side-frame ends which mount the larger-diameter sprocket pulleys 116, 118. Said rocker arms 160, 162 (and thereby the stage as a unit) are supported in a raised position above a base casting 164, which is bolted or otherwise secured to the machine base, on a pair of coil springs 166, 168 positioned on upright mounting studs 170, 172 bottomed in transversely spaced upright bosses 164a, 164b integral with said casting and which, by reference to FIG. 7, extend through suitable through-holes therefor in said rocker arms. At their upper ends the studs mount a lower pair of floating spring guides 174, 176 providing seats for the upper ends of said springs 166, 168 and which bear on the under sides of said rocker arms, and an upper pair of fixed position height-limit stops 178, 180, against which the upper sides of said rocker arms are biased by said springs. Preferably, as is seen in FIG. 7, the upper surfaces of the lower of floating spring guides 174, 176 are formed upwardly part-spherical and the surfaces of the rocker arms against which said surfaces bear, and which are recessed surfaces, are formed complementally part-spherical. Similarly, the under surfaces of the height-limit stops 178, 180 are formed downwardly part-spherical and the surfaces of the rocker arms on which said part-spherical surfaces bear, and which are also recessed surfaces, are formed complementally part-spherical. Accordingly, the stage may pitch as a unit about a transverse axis in the vertical plane containing the mounting studs 170, 172, and it may also roll to a limited degree about longitudinal axes extending through the stage, or it may partake of any combination of such pitch and roll motions as enables said stage to accommodate itself to plural mailing pieces of different thicknesses being advanced by said stage at one time or to a thick mailing piece being advanced along a line closer to one side edge of the stage than to the other, for example.

Figure 5:
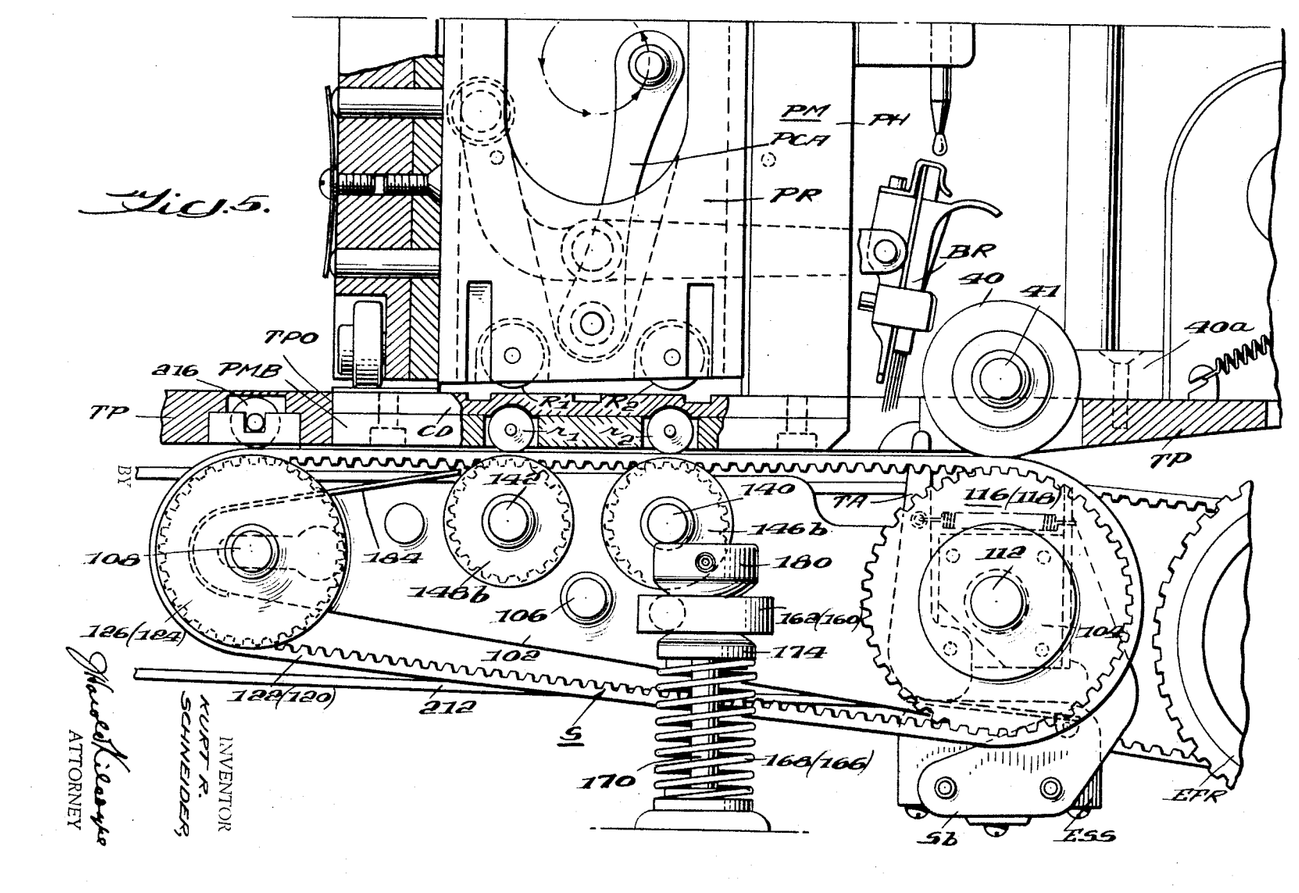
FIG. 5 is an enlarged broken-away part-sectional view which better illustrates the conveyor belt stage means of the invention in side elevation as well as its relation in space to the label-applying instrumentality, i.e. the punch mechanism.

It will be understood from the above that the twin timing belts 120, 122, which incidentally are desirably provided with an extra-thickness outside facing, are driven in unison upon drive being transmitted to the crossshaft 112 mounting the larger-diameter sprocket pulleys 116, 118, through the aforesaid shaft 37 (FIG. 4), whose end 38 is drivingly coupled to the drive-coupling end 112a of said cross shaft. The stage supporting springs 166, 168 are adjusted so that, with no mailing piece interposed between the upper, normally horizontal upper flights of the twin timing belts and the machine top plate TP, the forward ends of said belts will engage said rollers 40 and the rearward ends of said belts will engage the under surface of the top plate TP forwardly of the punch mechanism PM with light pressure. Accordingly, upon the pick-up end of the stage receiving a mailing piece advancing thereto from the aforesaid primary feed rollers ERF, said twin belts will advance said mailing piece to the punch ram operating within the punch housing PH, which punch ram, by reference to FIGS. 4 and 5, is disposed above the forward length portion of the conveyor belt stage and operates through an opening generally designated TPO (FIG. 5) in the top plate TP, all as explained in my prior patents and pending application aforesaid. As also explained in my prior patents and application, said punch mechanism on each of its working strokes will sever an individual label or label area from a label sheet L containing a plurality of said labels and apply same to an area of mailing piece being advanced to it by said stage which has been moistened by water applied thereto by a brush BR.

While said punch mechanism and mailing-piece moistening means form no part of the present invention and hence are not here described in detail, it is to be observed that, according to my aforesaid pending application Ser. No. 80,778 and also by concurrently filed application Ser. No. 451,469, directed per se to an improved design of said punch mechanism, the reciprocating punch ram PR of said punch mechanism and which is reciprocated by a crank arm PCA in upward and downward direction through said top plate opening TPO and in so doing moves past cutting dies CD carried by the frame-like base PHB of the punch housing PH, mounts rollers (herein designated $R_1$ and $R_2$, FIG. 5) in its under face. It is a feature of the present invention that the rollers 148, 150 disposed between the twin timing belts 120, 122 of the present conveyor-belt stage are vertically aligned with said punch rollers $R_1$, $R_2$ so as to be contacted thereby at the instant of lowest descent of the punch ram, thus to provide a non-frictional surface for the mailing piece at label impact therewith. Said frame-like base PHB of the punch housing PH is also provided on both its two long sides (housing back and front sides) with pairs of idler rollers $r_1$, $r_2$ which align vertically with and roll on the twin timing belts 120, 122 of said stage.

According to a further feature of the invention, the conveyor-belt stage of the invention mounts at its discharge end a label drop-off chute 184. As best seen in FIG. 6, said chute, which spans the space between the side frames 100, 102 to which it is secured as by attaching ears 186, inclines downwardly-forwardly from the upper periphery of the more forward intermediate roller 150 and terminates in a lower curved end which fits over the forward end of said frames. Said chute 184, acting in concert with said rollers 148 and 150, serves as a means to effect quick discharge of a label severed by the punch for which there is present no mailing piece in the label receiving position, and it may also serve to propel a canceled label at high speed out of the path of an advancing mailing piece.

Reverting to the aforesaid pillow block 104, the square section thereof, taken with its disposition between the twin timing belts 120, 122 makes said block an ideal means for mounting the mailing-piece sensing switch ESS and its actuating trip arm TA, of which said switch corresponds to the similarly designated "first article switch" described and illustrated in my aforementioned application Ser. No. 80,778 (Patent No. 3,252,849). More particularly, and also referring to FIG. 6, the pillow block may be vertically slotted in its forward or discharge-side face for the accommodation of said trip arm TA in its normally upright position and also to provide for pivotal securement of its lower end. Illustratively, said arm (for reasons which are not relevant here) is made in two pieces and the upper ends thereof are bent outwardly and thence upwardly to provide laterally spaced upwardly pointing fingers $Sf_1$ and $Sf_2$ (FIG. 8) which project a small distance above the upper line of said timing belts. To the opposite vertical face of said pillow block may be secured a switch-mounting bracket $Sb$ having a lateral gooseneck configuration and the lower horizontal arm thereof is secured the aforesaid microswitch ESS, the latter being thus accommodated in the space between the stage side frames 100, 102 and below the pillow block. A trip-arm biasing spring TAs extends between a fixed upward projection of said bracket and the upper free end of the trip arm TA, thus normally maintaining said arm in an upright position in which either one or both of said fingers $Sf_1$, $Sf_2$ will normally be disposed in the path of a mailing piece being advanced by said twin belts 120, 122 or one of them.

The aforesaid twin-belt conveyor stage S constitutes that portion of the mailing-piece feed-through means which serves to advance the mailing pieces to and immediately past the punch mechanism, and thence to run-out means which picks up the now labeled mailing pieces and discharges same from the machine through a suitable opening in the front end-wall thereof, said run-out means thus cooperating with said conveyor-belt stage in providing the integrated mailing-piece feed-through means as herein contemplated. Referring to FIGS. 3 and 4, said run-out means comprises two transversely extending, rubber-coated rollers 200, 202 disposed forwardly of said stages, of which the more forward roller 202 is disposed forwardly also of the front end of the machine, so as to insure that the discharging labeled mailing pieces will in effect be thrown clear of said machine. Said rollers 200, 202 are fast on cross shafts 200a, 202a journaled in side-frame members 204, 206 provided with horizontally aligned trunnions 204a, 206a resting in upwardly opening notches provided inspaced side brackets 208, 210 which are securely fastened to the top-plate mounting posts. Such arrangement provided that the rollers 200, 202 may rock in unison about the axis of said trunnions 204a, 206a.

At their corresponding ends which are generally aligned with the aforesaid timing belt $TB_2$, said rollers 200, 202 are provided with O-belt pulleys 200p, 202p, over which is trained an endless O-belt whose other or driving end is trained over an O-belt pulley 33p affixed to the aforesaid driven sprocket pulley 33 of the drive means for the conveyor belt stage. By properly locating the trunnions 204a, 206a along the length of the side-frame members 204, 206 from which they project, tension on the O-belt 212 will urge the inside or more rearward roller 200 upwardly and the outer or more forward roller 202 downwardly. To minimize friction between the mailing pieces and the under surface of the top plate which might otherwise result from said roller 200 being urged upwardly as aforesaid, antifriction means in the form of a plurality of cage-mounted antifriction rollers 214 are set into a downwardly opening recess in said top-plate which is located above said run-out roller 200. Similar cage-mounted rollers 216 are also preferably set into a downwardly opening recess in the top-plate which is located just above the discharge end of the conveyor-belt stage.

As the aforesaid label-sensing switch LSS, the timing cams 70a, 70b, the cam switches CSa and CSb actuated by said cams, and the mailing-piece sensing switch ESS are components of the machine control circuit and/or cyling means with which the present invention is not specifically concerned and as said components and their operation are fully described in my aforesaid application Ser. No. 80,778 (Patent No. 3,252,849), to which reference may be had for details, no further description thereof herein is believed to be necessary.

From actual experience, it is stated that a conveyor-belt stage component of the mailing-piece feed-through means as herein proposed is superior in terms of performance and trouble-free operation to the various types of conveyor-belt stages of the earlier designs shown in my aforesaid patents and/or application Ser. No. 80,778 (Patent No. 3,252,849). Among such advantages may be mentioned the simplicity of assembly and lack of any requirement for precise lining up of the timing belt sprockets, as compared to the prior forms of stage which utilized gear means for driving the conveyor-belt or belts. The present stage construction also permits a desired adjustment of the parts to be maintained, even under conditions of wear of the sprockets and/or timing belts having occurred. Another advantage is that the employment of twin timing belts whose tension can be readily adjusted, in place of gearing, eliminates the difficulties previously encountered due to stretch of the conveyor belts or slippage thereof on their gear drive pulleys. The use of timing belts is also of particular advantage in that their use makes immaterial whether the timing belts, or each of them, are pulled or pushed by their driving pulleys 166, 118. Moreover, in the particular stage construction illustrated in which the timing belts at their pick-up ends are driven by large diameter pulleys and thence extend about smaller idler pulleys at the discharge end of the stage unit, forces building up in the upper surface of the belt as tends to buckle thin mailing matter on said belts are effectively counteracted.

Again, by mounting the unit for pitching motion about an axis disposed only about a third of the length of the entire stage from its pick-up end, the conveyor belts, by the law of force of their mounting means acting as a lever, permit the application of greater upward pressure by the rearward or pickup region of the stage than at its forward or discharge end. This is an important feature, because in the operation of label-applying machines of the character to which the present invention pertains, it is possible for a condition to arise wherein a relatively thin mailing piece may just enter the stage pick-up end or region while a just labeled thicker piece is about to leave the stage discharge end. In my prior designs of conveyor belt stages, such a condition was an invitation to trouble from slippage at the pick-up end of the stage, such because of inability of the stage to provide the requisite upward pressures on both the mailing piece entering and the one leaving the stage pick-up. As distinguished therefrom, the present conveyor belt stage is enabled to balance out whatever pressure differentials are encountered in advancing pieces of mail throughout the length thereof, regardless of differences in thickness thereof.

The above described mailing piece run-out means associated with the twin-belt conveyor stage combines therewith in providing greatly improved feed-through of the mailing pieces, as compared to that of my aforesaid prior patents and application. More particularly, by a proper selection of O-belt pulley ratios, the run-out rollers 200, 202 may be driven at a somewhat higher rate of speed than the twin belts 120, 122 of said conveyor stage. Equally important is the fact that the run-out rollers serve as a support for a mailing piece of the heavier classifications, such as large filled envelopes or magazines, discharging from the conveyor-belt stage, since said rollers are so mounted that they will automatically adjust themselves, if necessary, to the maximum thickness of mailing piece which the machine is designed to handle, thereby relieving the conveyor-belt stage of the necessity of having to carry the overhanging full weight of a heavy mailing piece which is in the process of being discharged therefrom following proper labeling. The positioning of said run-out rollers is further such that they do not interfere in any way with the desired high-speed discharge of rejected labels or labels for which no mailing pieces are present on the conveyor-belt stage, via the aforesaid label discharge chute 184.

As many changes could be made in carrying out the above constructions without departing from the scope of the invention, it is intended that all matter contained in the above description or shown in the accompanying drawings shall be interpreted as illustrative and not in a limiting sense.

I claim:

1. A conveying mechanism for feeding generally thin flat articles along a predetermined path comprising a conveyor-belt stage for supportingly advancing articles in a singular fashion along said path, said conveyor-belt stage including a frame, means journalling a conveyor belt relative to said frame such that an upper run moves along said path from an article entrance end toward an article discharge end, spring means supporting said conveyor-belt stage at a position generally medially of said frame between said article entrance and discharge ends, means for effecting bodily pitching and rolling action of said conveyor-belt stage, and said last-mentioned means being similarly disposed at the position of said spring means generally medially of said frame whereby the conveyor-belt stage constantly compensates for article thickness and produces generally uniform pressure on all articles irrespective of variations in the thickness thereof during the passage of the articles from said article entrance end to said article discharge end.

2. The conveying mechanism as defined in claim 1 wherein said spring means is disposed only at said medial position of said frame.

3. The conveying mechanism as defined in claim 1 wherein said pitching and rolling means is disposed only at the medial position of said frame.

4. The conveying mechanism as defined in claim 1 wherein both said spring means and said means for effecting pitching and rolling action are only disposed at said medial position.

5. The conveying mechanism as defined in claim 1 wherein another endless conveyor belt is journalled relative to said frame with an upper run thereof being in parallel spaced relationship to the upper run of said first-mentioned conveyor belt, and means for driving said conveyor belts in unison.

6. The conveying mechanism as defined in claim 1 wherein said journalling means includes a shaft carrying a roller about which a portion of said conveying belt is entrained, means for adjusting the tension of said belt, said adjusting means being elongated slot means in said frame disposed generally lengthwise of said frame, said shaft being slidably received in said slot means, and means for securing said shaft at any desired position along the length of said slot means.

7. The conveying means as defined in claim 1 including article run-out means disposed beyond said article discharge end in alignment with said conveyor-belt stage, and means mounting said article run-out means for pivoting movement about an axis normal to said predetermined path.

8. The conveying mechanism as defined in claim 1 including article run-out means disposed beyond said article discharge end in alignment with said conveyor-belt stage, means mounting said article run-out means for pivoting movement about an axis normal to said predetermined path, and said article run-out means being a medially pivoted member having a roller journalled at opposite ends thereof.

9. The conveying mechanism as defined in claim 1 wherein another endless conveying belt is journalled relative to said frame with an upper run thereof being in parallel spaced relationship to the upper run of said first-mentioned conveyor belt, roller means positioned between said conveyor belt intermediate said article entrance end and discharge end, and means for driving said roller means from only one of said endless conveying belts.

10. The conveying mechanism as defined in claim 1 including rollers journalled at opposite ends of said frame about which said conveying belt is entrained, and the roller adjacent said entrance end is larger in diameter than the roller adjacent said discharge end.

11. The conveying mechanism as defined in claim 1 wherein said means for effecting bodily pitching and rolling action of said conveyor-belt stage is positioned more closely adjacent said article discharge end than said article entrance end.

12. The conveying mechanism as defined in claim 1 wherein said means for effecting bodily pitching and rolling action of said conveyor-belt stage includes a pair of rocker arms journalled to and extending laterally from said frame, support means adjacent each rocker arm, and means articulately coupling said support means to said rocker arms.

13. The conveying mechanism as defined in claim 1 wherein another endless conveying belt is journalled relative to said frame with an upper run thereof being in parallel spaced relationship to the upper run of said first-mentioned conveying belt, roller means between said conveying belts, and means for rotating said roller means in synchronism with the movement of said upper runs of said conveying belts.

14. The conveying mechanism as defined in claim 1 wherein said means for effecting bodily pitching and rolling action is defined by universal joint means coupled between said frame and a base of said conveying mechanism.

15. The conveying mechanism as defined in claim 1 wherein said means for effecting bodily pitching and rolling action of said conveyor-belt stage includes universal joint means connected between said frame and a base of said conveying mechanism, and said spring means is disposed between said universal joint means and said base.

References Cited

UNITED STATES PATENTS

| | | | |
|---|---|---|---|
| 1,100,790 | 6/1914 | Stein | 156—521 |
| 2,946,281 | 7/1960 | Sohn | 156—384 |
| 3,010,864 | 11/1961 | Schneider et al. | 156—363 |

EARL M. BERGERT, *Primary Examiner.*

W. E. HOAG, *Assistant Examiner.*

U.S. Cl. X.R.

156—528; 198—121; 271—45.